UNITED STATES PATENT OFFICE.

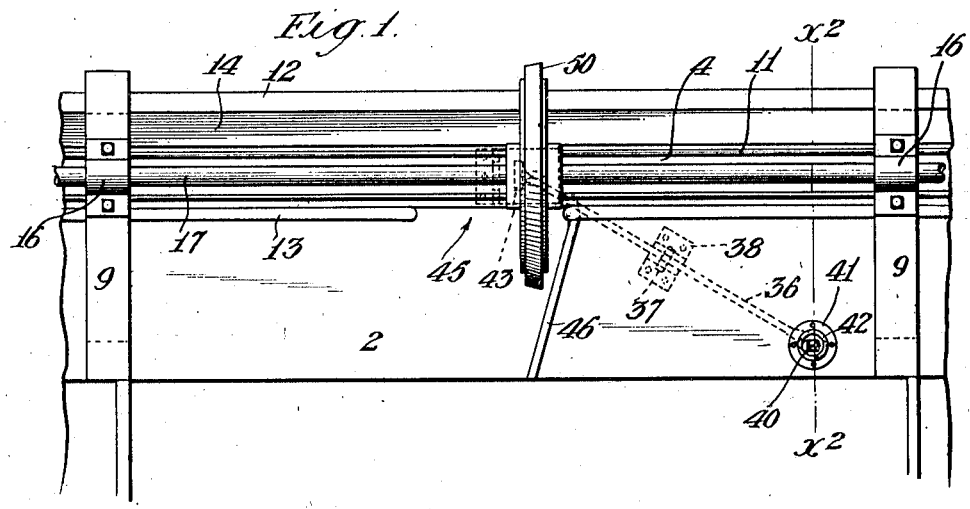

RICHARD D. VAN DUYNE, OF EAST HIGHLANDS, CALIFORNIA, ASSIGNOR TO GOLD BUCKLE ASSOCIATION, OF EAST HIGHLANDS, CALIFORNIA, A CORPORATION OF CALIFORNIA.

FRUIT-GRADING MACHINE.

1,031,403.  Specification of Letters Patent.  Patented July 2, 1912.

Application filed December 12, 1911. Serial No. 665,396.

*To all whom it may concern:*

Be it known that I, RICHARD D. VAN DUYNE, a citizen of the United States, residing at East Highlands, in the county of San Bernardino and State of California, have invented a new and useful Fruit-Grading Machine, of which the following is a specification.

My invention relates to a device for grading fruit and is particularly adapted for the purpose of grading oranges by distributing the oranges according to their size into separate bins, and one of the main objects of my invention is to produce a device of the character described of simple form and construction in which the grading elements may be easily and accurately adjusted for the purpose of grading the fruit according to the desired sizes.

Another object of my invention is to construct a fruit grader of the class described in which few moving parts of light construction may be utilized, thereby reducing the power required to a minimum.

Other objects and advantages will appear hereinafter from the following specification.

Referring to the drawings, which are for illustrative purposes only:—Figure 1 is a plan view of a portion of a grader embodying a form of my invention. Fig. 2 is a sectional view on line $x^2$—$x^2$ Fig. 1. Fig. 3 is a sectional view on line $x^3$—$x^3$ Fig. 2. Fig. 4 is a diagrammatic plan view of the grader.

The grader comprises a longitudinally disposed table consisting of a flat member or board 1 and an inclined member or board 2, the upper surface of which forms a delivery means from the member 1 to a series of bins. The member 1 forms a supporting member for the upper run of an endless belt or conveyer 4, which belt 4 is supported at each end on wheels or drums 5 and 6 mounted on suitable brackets 3 secured to each end of the table, the drum 6 being driven in any suitable manner in the direction of the arrow shown in Fig. 3 through the medium of the drum supporting shaft 7. The table is supported by means of suitable uprights 8 which extend above the table and are connected at their upper ends by means of cross pieces 9. Fruit is delivered onto the belt 4 by any suitable hopper means indicated at 10 and is retained on the belt by means of longitudinal ribs 11 formed adjacent the opposite edges of the belt. Should the fruit crowd on the belt, however, sufficiently to cause the fruit to ride over the ribs 11, means are provided for returning the fruit to the belt which consist of longitudinal
members or guides 12 and 13, respectively, at each side of the belt which are secured to the member 1 and are also each provided with inclined faces 14 arranged in such a manner as to cause the fruit to run back on the belt.

Supported on the cross pieces 9 in suitable brackets 16 is a shaft 17 which extends longitudinally throughout the length of the table and is provided at one end with a pulley 18 adapted to receive a driving belt 19 for the purpose of driving the shaft 17 in the direction of the arrow indicated in Fig. 2.

Mounted at intervals on the shaft 17 is a series of fruit distributing disks 50 consisting of a pair of plates 20 secured together by suitable screws 21, each plate on the inner side being provided with a circular recessed portion 22 in the periphery thereof, so that when the plates are secured together, as shown in Fig. 3, the recessed portions 22 form a circular groove adapted to receive a circular strip or band of rubber 23, or other similar material, forming a frictional means for engaging the fruit as it travels on the belt 4. The circular band or strip 23 is beveled, as indicated at 24, for the purpose of presenting a suitable bearing face to engage the fruit, so that the band 23 engages the fruit over a substantial portion of its surface resulting in a good frictional contact; at the same time reducing the wear on the band. Each distributing disk is secured to the shaft 17 by means of a suitable set screw 26 which extends through a hub 27 on one of the plates 20.

Directly under each distributing disk, the member 1 is provided with an opening 30 adapted to receive an adjusting plate or leaf 31 freely movable therein and having one end curved downwardly, as indicated at 32 in Fig. 3. The leaf 31 is pivoted at its other end on a suitable pintle 33 supported in a plate 34 which is set into the upper face of the member 1 and secured thereto by means of a suitable screw 35. The leaf 31 is supported by means of a supporting member which consists of a pivoted lever or bar 36 mounted on a pin 37 in brackets 38 secured to the underside of the member 2 of the table. The inner end of the lever 36 is turned upwardly, as indicated at 43, and rests against the underside of the leaf 31. The outer end of the lever 36 is flattened and extends under a set screw or bolt 40, the lower end of which engages the upper face of the end 39 of the lever. The set screw 40 is supported in a suitable plate 41 internally threaded to engage the threads of the set screw 40 and provided with an upwardly extending circular flange 42 surrounding the head of the set screw 40 and extending a short distance thereabove for the purpose of protecting the head of the set screw. The flange 42 prevents inadvertent turning of the set screw, which would change the relation of the grading elements, and also serves the purpose of preventing manipulation of the set screw except by a special wrench. With the construction just described the screw 40 may be set by an authorized person only having the particular style of wrench required. Opposite each distributing disk 50 the guide 13 is cut away forming an opening 45, and a rail or guide 46 is secured to the top of the member 2, extending from one side of the opening 45 to the outer edge of the member 2, for the purpose of delivering the fruit on the member 2 into a receiving bin or hopper 47, one of a series of hoppers 47 being opposite each distributing disk throughout the length of the table.

The device operates in the following manner: The fruit delivered on the belt 4 by means of the hopper 10 is carried by the belt in the direction of the arrows shown in Figs. 3 and 4 under the distributing disks 50 thereabove. The disks 50 rotating in the direction of the arrow shown in Fig. 2 cause the fruit coming into engagement therewith to be thrown off the belt by frictional contact between the disks and the fruit. The fruit thus thrown off the belt 4 passes through the opening 45 in the guide 13 onto the inclined member 2 of the table, from whence the fruit rolls into the respective bins 47. The distribution of the fruit according to the size is arranged by adjusting the space between the face 24 of the distributing disks and the upper or carrying face of the belt 4, which adjustment is accomplished by operating the respective set screws 40 for each plate 31 under the belt 4, thereby raising the belt at points directly under each distributing disk. The largest fruit on the belt 4 is delivered into the first bin 47 by means of the first distributing disk, and the smaller fruit passes thereunder until all of the fruit according to the size thereof is distributed into the respective bins, the belt under the second distributing disk being raised by the plate 31 thereunder so that the distance between the belt and the distributing disk is slightly less, approximately an eighth of an inch, than the distance between the belt and the first distributing disk, so that as the fruit passes under the second distributing disk the next smaller size of fruit is engaged by the second distributing disk and thrown off the belt, through the opening 45 in the guide 13, and onto the member 2 of the table from whence it runs into the second bin or hopper. The belt under each succeeding disk is raised a gradually increasing height so that each succeeding disk removes from the belt all the fruit of the next succeeding lower grade or size, the under sized fruit passing under the last distributing disk and being delivered by the belt into any suitable hopper or receptacle, not shown. The oranges or fruit being graded are of uneven contour and the beveled face of each band 23 permits the adjustment for size to be made at a point midway between each side of the band, so that should an uneven portion of the fruit come into engagement with the band, the surface at either side of the central portion thereof would engage the fruit and remove the same from the belt, so that each distributing disk removes from the belt fruit of the same size or grade.

What I claim is:—

1. A fruit grader comprising a longitudinally movable fruit carrier, fruit engaging disks above said carrier, and means for independently raising or lowering said carrier under each of said disks.

2. A fruit grader comprising a longitudinally movable fruit carrier, a rotatable shaft supported above said carrier, a plurality of fruit distributing disks on said shaft above said carrier, and means for independently raising or lowering a portion of said carrier under each distributing disk.

3. A fruit grader comprising an endless belt adapted to carry fruit thereon, a rotatable shaft above said belt, a plurality of fruit distributing disks on said shaft, and means engaging the upper run of said belt below each distributing disk to vary the space between said belt and the respective distributing disks.

4. A fruit grader comprising an endless belt, a table arranged to support one run of said belt, means for driving said belt, a rotatable shaft supported above said belt, a plurality of distributing disks secured to said shaft, and means supported by said table under each distributing disk to raise or lower the portion of the belt thereunder.

5. A fruit grader comprising an endless belt, a table arranged to support one run of said belt, means for driving said belt, a rotatable shaft supported above said belt longitudinally thereof, a plurality of distributing disks secured to said shaft, means supported by said table under each distributing disk to raise or lower the portion of the belt thereunder, said means consisting of a leaf adapted to engage the lower face of said belt, and means for raising and lowering said plate.

6. A fruit grader comprising an endless belt, a table arranged to support one run of said belt, means for driving said belt, a rotatable shaft supported above said belt longitudinally thereof, a plurality of distributing disks secured to said shaft, a leaf pivoted to said table under each distributing disk adapted to engage the lower face of the belt thereunder, a pivoted arm adapted to support said leaf, and means for raising and lowering said arm.

7. A fruit grader comprising an endless belt, a table adapted to support one run of said belt, a guide at each side of said belt on said table, a rotatable shaft above said belt longitudinally thereof, a plurality of distributing disks secured to said shaft, a leaf pivoted to said table under the belt thereon and below each of said distributing disks, a pivoted arm adapted to engage the lower side of each of said leaves to raise and lower the same, means for raising and lowering said arm, means for driving said belt, and means for rotating said shaft.

8. A fruit grader comprising a table, an endless belt having one run thereof supported on said table, a guide at each side of said belt on said table, a rotatable shaft supported above said belt longitudinally thereof, a plurality of distributing disks secured to said shaft, one of said guides being cut away opposite each distributing disk to form a delivery opening therethrough, a leaf pivoted to said table in engagement with the under face of the belt thereon below each distributing disk, an arm pivotally mounted on said table adapted to raise and lower said leaf, and means for rocking said arm to raise or lower the belt on said leaf.

9. A fruit grader comprising an endless belt adapted to carry fruit thereon, a rotatable shaft above said belt longitudinally thereof, a plurality of fruit distributing disks secured to said shaft, each distributing disk having a beveled face of frictional engagement material, and means under each distributing disk to raise or lower the portion of the belt thereunder.

In testimony whereof, I have hereunto set my hand at East Highlands, California, this 2 day of Dec., 1911.

RICHARD D. VAN DUYNE.

In presence of—
J. L. JOHNSON,
C. S. HAMILTON.